(12) United States Patent
Ikeda

(10) Patent No.: US 9,784,374 B2
(45) Date of Patent: Oct. 10, 2017

(54) FLUID CONTROL DEVICE

(71) Applicant: Aisin Seiki Kabushiki Kaisha, Kariya-shi (JP)

(72) Inventor: Mitsuru Ikeda, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/920,065

(22) Filed: Oct. 22, 2015

(65) Prior Publication Data

US 2016/0116004 A1 Apr. 28, 2016

(30) Foreign Application Priority Data

Oct. 24, 2014 (JP) ................................. 2014-217327

(51) Int. Cl.
*F15B 15/00* (2006.01)
*F16K 11/04* (2006.01)
*F16K 31/40* (2006.01)
*F16D 48/02* (2006.01)

(52) U.S. Cl.
CPC .............. *F16K 11/04* (2013.01); *F16D 48/02* (2013.01); *F16K 31/406* (2013.01); *F16K 31/408* (2013.01); *F16D 2048/0203* (2013.01); *F16D 2048/0209* (2013.01); *F16D 2048/0221* (2013.01); *F16D 2048/0233* (2013.01)

(58) Field of Classification Search
CPC ...... F16K 11/04; F16K 31/406; F16K 31/408; F16D 48/02; F16D 2048/0203; F16D 2048/0233; F16D 2048/0221; F16D 2048/0209; F16D 25/14; Y10T 137/87209; Y10T 137/7764; Y10T 137/7761; Y10T 137/7768; Y10T 137/7772

USPC ............ 137/596.16, 487.5, 489, 489.5, 493, 137/493.1; 60/414, 424

See application file for complete search history.

(56) References Cited

U.S. PATENT DOCUMENTS

| 3,103,337 | A | * | 9/1963 | Forte ..................... F16K 31/408 |
| | | | | 251/30.03 |
| 3,856,047 | A | * | 12/1974 | Takayama ............... B60T 8/341 |
| | | | | 137/625.61 |
| 4,592,533 | A | * | 6/1986 | Guglielmi ............. F16K 31/408 |
| | | | | 251/129.15 |

(Continued)

FOREIGN PATENT DOCUMENTS

JP 2000-313252 11/2000

*Primary Examiner* — Minh Le
(74) *Attorney, Agent, or Firm* — Oblon, McClelland, Maier & Neustadt, L.L.P.

(57) ABSTRACT

A fluid control device includes: a valve body accommodating chamber having an inner space divided into a first chamber and a second chamber by a first valve body; a receiving port, which opens to the first chamber and through which a fluid from an accumulator is received in the first chamber, and a discharge port, which opens to the first chamber and through which the fluid is discharged from the first chamber; a guide path guiding the fluid from the accumulator to the second chamber such that the first valve body moves to a valve-closed position to close the discharge port; a second valve body switchable between a state of maintaining pressure of the fluid guided to the second chamber and a state of releasing the pressure; and a bias member biasing the first valve body to the valve-closed position.

5 Claims, 3 Drawing Sheets

(56) References Cited

U.S. PATENT DOCUMENTS

| | | | | |
|---|---|---|---|---|
| 4,623,118 A * | 11/1986 | Kumar | F15B 13/015 | 137/596.16 |
| 4,667,695 A * | 5/1987 | Gold | G05D 16/10 | 137/486 |
| 5,009,388 A * | 4/1991 | Pei-gi | F16K 31/408 | 251/160 |
| 5,370,354 A * | 12/1994 | Kunz | F16K 31/0658 | 251/129.15 |
| 6,149,124 A * | 11/2000 | Yang | F16K 31/408 | 251/30.03 |
| 6,330,798 B1 * | 12/2001 | Stephenson | F15B 11/006 | 60/424 |
| 6,502,393 B1 * | 1/2003 | Stephenson | F15B 11/006 | 60/414 |
| 6,745,992 B2 * | 6/2004 | Yang | F15B 13/0405 | 251/129.15 |
| 6,886,802 B2 * | 5/2005 | Bartolacelli | F16K 31/408 | 251/129.15 |
| 6,971,232 B2 * | 12/2005 | Singh | B60K 6/12 | 251/30.02 |
| 7,036,527 B2 * | 5/2006 | Ezaki | F16K 31/423 | 137/881 |
| 7,341,236 B2 * | 3/2008 | Stephenson | F16K 31/0689 | 251/30.03 |
| 8,066,255 B2 * | 11/2011 | Wang | F16K 31/408 | 251/30.03 |
| 8,960,639 B2 * | 2/2015 | Hilzendegen | F16K 31/408 | 251/129.15 |
| 9,266,519 B2 * | 2/2016 | Morino | F16H 61/00 | |
| 2010/0155633 A1 * | 6/2010 | Pfaff | F15B 13/0405 | 251/30.02 |
| 2015/0075474 A1 * | 3/2015 | Morino | F16H 61/0021 | 123/179.3 |
| 2015/0219239 A1 * | 8/2015 | Zeiner | F16K 31/408 | 251/30.01 |
| 2016/0011601 A1 * | 1/2016 | Inagaki | F16H 61/0206 | 700/282 |
| 2016/0069465 A1 * | 3/2016 | Suzuki | F15B 13/0433 | 137/625.48 |

* cited by examiner

FLUID CONTROL DEVICE

CROSS REFERENCE TO RELATED APPLICATIONS

This application is based on and claims priority under 35 U.S.C. §119 to Japanese Patent Application 2014-217327, filed on Oct. 24, 2014, the entire contents of which are incorporated herein by reference.

TECHNICAL FIELD

This disclosure relates to a fluid control device that causes a fluid in an accumulator to flow through a fluid supply path to a hydraulic pressure operated device such as a hydraulic clutch.

BACKGROUND DISCUSSION

In the fluid control device, a fluid pressure accumulated in the accumulator is used such that the hydraulic pressure operated device can operate, for example, during de-actuation of a hydraulic pump.

JP 2000-313252A (Reference 1) discloses an oil control device that causes oil accumulated in an accumulator to flow through an oil supply path to a hydraulic clutch, at the time of restarting of an automotive engine in which an operation of an oil pump is stopped.

The oil control device includes an oil inflow path through which the oil accumulated in the accumulator is caused to flow to the oil supply path which is connected to the hydraulic clutch from the oil pump, and a valve body that closes and opens the oil inflow path by energizing and de-energizing of a solenoid.

A valve body accommodating chamber, in which the valve body is movably accommodated, includes a receiving port through which the oil is received from the accumulator and a discharge port through which the received oil is discharged.

The valve body moves, by energizing and de-energizing of a solenoid, between a valve-opened position, which allows the receiving port and the discharge port to communicate with each other, and a valve-closed position, which stops the receiving port and the discharge port from communicating.

The valve body is caused to move to the valve-opened position when the oil from the accumulator is caused to flow through the oil supply path, and the valve body is caused to move to the valve-closed position when the oil is caused not to flow through the oil supply path.

A fluid control device in the related art includes a valve body that moves between a valve-opened position and a valve-closed position by energizing and de-energizing of a solenoid, and causes the valve body to move against a fluid pressure accumulated in an accumulator.

Accordingly, when a fluid pressure accumulated in the accumulator is increased, there is a need to provide a solenoid having an operation force (suction force) which is sufficient to move the valve body against the fluid pressure.

SUMMARY

Thus, a need exists for a fluid control device which is not suspectable to the drawback mentioned above.

A feature of a fluid control device according to an aspect of this disclosure resides in a configuration in which the fluid control device includes a valve body accommodating chamber having an inner space that is divided into a first chamber and a second chamber by a first valve body; a receiving port, which opens to the first chamber and through which a fluid from an accumulator is received in the first chamber, and a discharge port, which opens to the first chamber and through which the fluid is discharged from the first chamber; a guide path that guides the fluid from the accumulator to the second chamber such that the first valve body moves to a valve-closed position to close the discharge port; a second valve body which is switchable between two states of maintaining and releasing pressure of the fluid guided to the second chamber; and a bias member that biases the first valve body to the valve-closed position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

First Embodiment

Figure 1:
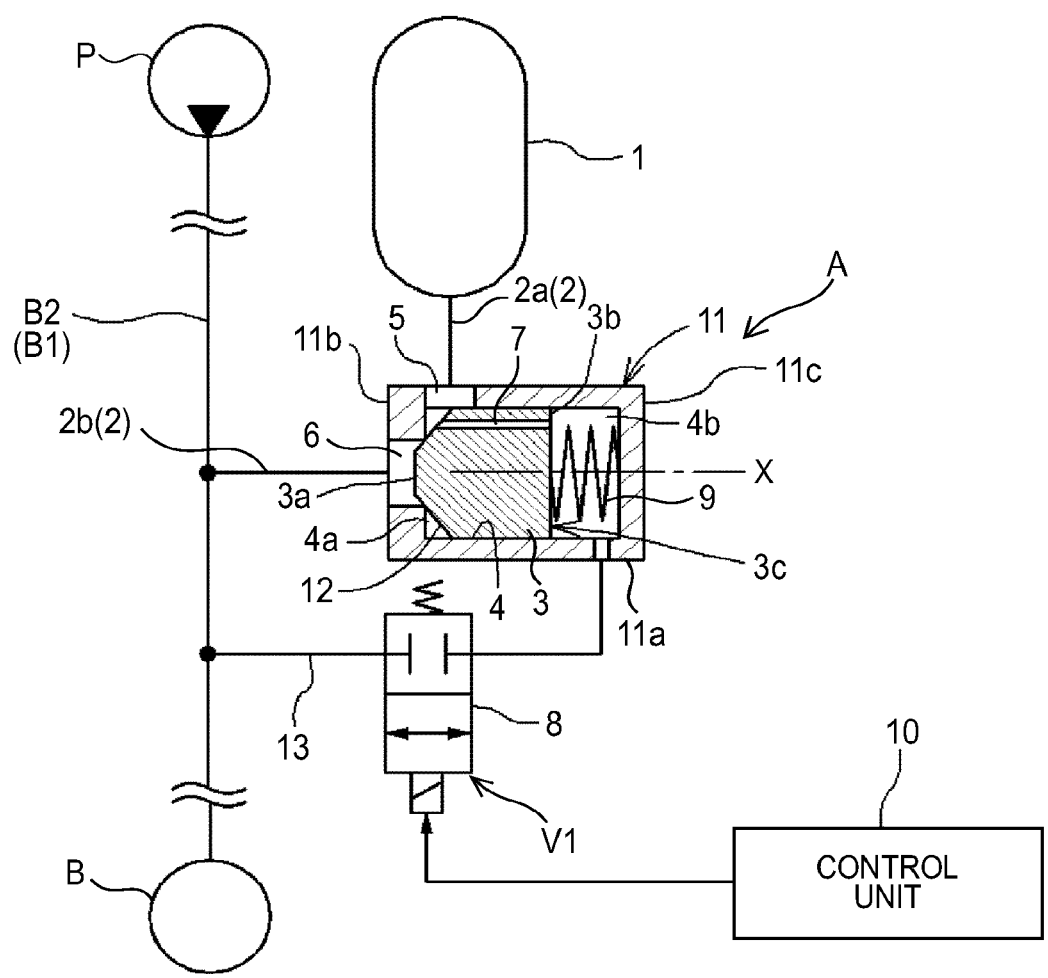
FIG. 1 is a sectional view illustrating a fluid control device of a first embodiment, in which a first valve body is disposed at a valve-closed position.
Figure 2:
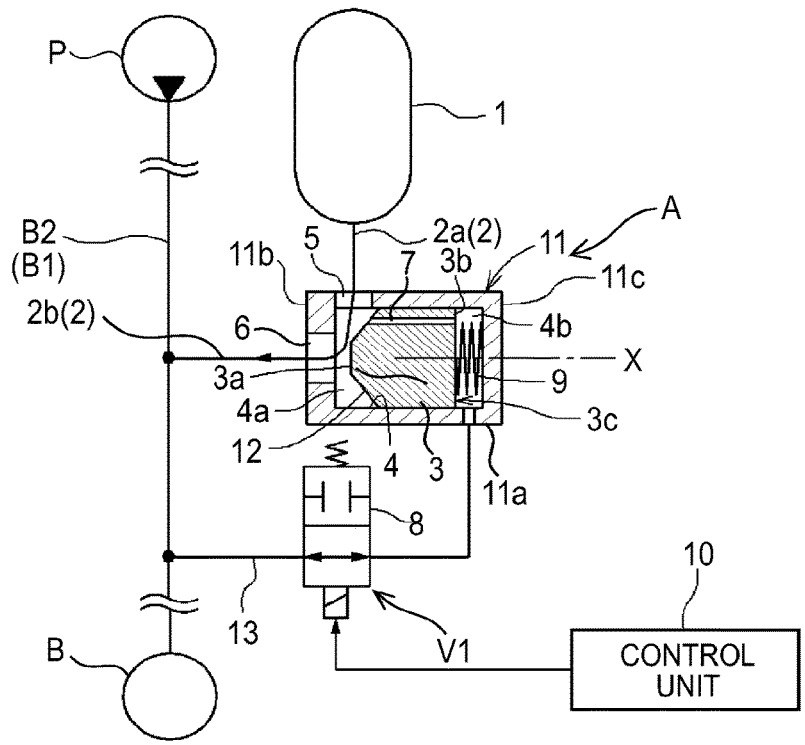
FIG. 2 is a sectional view illustrating the fluid control device of the first embodiment, in which the first valve body is disposed at a valve-opened position.

A fluid control device A of the first embodiment is illustrated in FIG. 1 and FIG. 2 and is connected to a hydraulic circuit B1 of a hydraulic clutch B which transmits and cuts off power between an automotive engine and an automotive transmission, for example.

The hydraulic circuit B1 includes an oil supply path B2 through which oil (as an example of a fluid) discharged from an oil pump P driven by an engine is supplied to the hydraulic clutch B.

The fluid control device A includes an oil inflow path 2 through which oil accumulated in an accumulator 1 flows to the oil supply path B2, causes the oil accumulated in the accumulator 1 to flow to the oil supply path B2 from the oil inflow path 2 when an engine stopped by a start-stop system restarts, and supplies hydraulic pressure to the hydraulic clutch B.

The hydraulic clutch B corresponds to a "hydraulic pressure operated device", the oil supply path B2 corresponds to a "fluid supply path", and the oil inflow path 2 corresponds to a "fluid inflow path".

The fluid control device A includes a valve body accommodating chamber 4 having a cylindrical inner space that is divided into a first chamber 4a and a second chamber 4b by a piston-type first valve body 3, a receiving port 5 through which oil from the accumulator 1 is received in the first chamber 4a, a discharge port 6 through which the oil received in the first chamber 4a through the receiving port 5 is discharged, a guide path 7 that guides the oil from the accumulator 1 to the second chamber 4b, a second valve body 8 which is switchable between two states of maintaining and releasing the pressure of the oil guided to the second chamber 4b, a bias member 9 that is provided in the second chamber 4b to bias the first valve body 3 to the valve-closed position such that the discharge port 6 is closed, and a control unit 10 that controls a switching operation of the second valve body 8.

The valve body accommodating chamber 4 is formed on the inner side of a valve casing 11 including a tube wall portion 11a having a quadrangular external appearance, a quadrangular front end wall portion 11b which closes the front end side of the tube wall portion 11a, and a quadrangular rear end wall portion 11c which closes the rear end side thereof, and the valve body accommodating chamber is connected to the oil inflow path 2 at an intermediate position.

The first chamber 4a is formed between the front end wall portion 11b and the first valve body 3 and the second chamber 4b is formed between the first valve body 3 and the rear end wall portion 11c.

Further, the valve body accommodating chamber 4 may be formed on the inner side of the valve casing 11 including a tube wall portion 11a having a circular external appearance and circular front and rear end wall portions 11b and 11c.

The receiving port 5 is opened to the first chamber 4a in the radial direction of the first valve body 3 and the discharge port 6 is opened to the first chamber 4a in the axial direction of the first valve body 3.

The receiving port 5 is formed to have a circular shape and to penetrate the tube wall portion 11a at a position close to the front end wall portion 11b and is connected to and communicates with an upstream-side portion 2a of the oil inflow path 2. The discharge port 6 is formed to penetrate the front end wall portion 11b and to have a circular shape which is concentric to a valve body axis X and is connected to and communicates with a downstream-side portion 2b of the oil inflow path 2.

The first valve body 3 is formed to have a shaft shape including a tip portion 3a formed to have a circular truncated cone shape with a conic lateral surface 12 and a rear end portion 3b formed to have a circular cylindrical shape, and both tip and rear end portions are concentric.

An end surface 3c facing the second chamber 4b of the rear end portion 3b is formed to have a flat surface orthogonal to the valve body axis X.

The first valve body 3 is movably accommodated in a direction of the valve body axis X, from the valve-closed position at which a part of the tip portion 3a is inserted into the inner side of the discharge port 6 as illustrated in FIG. 1 to the valve-opened position at which the tip portion 3a slips out from the discharge port 6 as illustrated in FIG. 2.

The pressure of the oil guided to the second chamber 4b through the guide path 7 causes the first valve body 3 to move to the valve-closed position at which the first valve body is pressed to the discharge port 6 and the communication between the receiving port 5 and the discharge port 6 is blocked.

The second valve body 8 corresponds to a valve body of an electromagnetic switching valve V1 connected to a communication path 13 which directly communicates between the second chamber 4b and an intermediate position of the oil supply path B2.

In the switching valve V1, through energization, the oil in the second chamber 4b can be released to the outside without passing through the valve body accommodating chamber 4. The second chamber 4b communicates with the oil supply path B2 and the pressure of the oil in the second chamber 4b is released. Meanwhile, de-energization stops the second chamber 4b and the oil supply path B2 from communicating.

The guide path 7 is a throttle flow path having a sectional area smaller than that of the communication path 13 and is formed to penetrate the first valve body 3 such that the first chamber 4a communicates with the second chamber 4b.

Although not illustrated, a communication path, through which the second chamber 4b communicates with the downstream-side portion 2b of the oil inflow path 2, may be provided, and a valve body of an electromagnetic switching valve, which is connected to the communication path, may be provided as the second valve body.

The bias member 9 is configured of a coil spring which is mounted between the rear end wall portion 11c and the first valve body 3 in a state of compressive deformation and biases and causes the first valve body 3 to move to the valve-closed position such that the conic lateral surface 12 comes into contact with a peripheral edge of the discharge port 6, as illustrated in FIG. 1.

The bias force of the coil spring (bias member) 9 is set to be smaller than a force applied to cause the first valve body 3 to move to the valve-opened position due to the oil received in the first chamber 4a from the receiving port 5.

The receiving port 5 is opened to the first chamber 4a remaining between the conic lateral surface 12 of the first valve body 3 and the front end wall portion 11b in the state in which the first valve body 3 moves to the valve-closed position.

The conic lateral surface 12 formed on the tip portion 3a of the first valve body 3 functions as a pressure receiving surface which receives the pressure of the oil flowing in the first chamber 4a from the receiving port 5.

The pressure of the oil is applied to the conic lateral surface 12, and thereby a component force is generated and causes the first valve body 3 to move to the valve-opened position in the direction of the valve body axis X.

An operation of the fluid control device described above will be described.

When the engine is driven, a non-energizing state is maintained in the switching valve V1, the second valve body 8 moves to the valve-closed position, as illustrated in FIG. 1, and the oil, with which the accumulator 1 is filled, is guided to the second chamber 4b through the receiving port 5, the first chamber 4a, and the guide path 7.

At this time, since the pressure of the oil from the accumulator 1 is applied to the conic lateral surface 12; however, a projected area of the conic lateral surface 12 in the direction of the valve body axis X is smaller than the area of the end surface 3c facing the second chamber 4b of the first valve body 3, the first valve body 3 moves to the valve-closed position due to the pressure of the oil guided to the second chamber 4b.

Accordingly, the oil from the accumulator 1 does not flow to the oil supply path B2.

Further, the bias member 9 functions of stably holding the first valve body 3 at the valve-closed position by the bias force thereof, regardless of a change of the pressure of the oil from the accumulator 1.

When the engine is stopped by the start-stop system, driving of the oil pump P is stopped, the oil is not supplied to the hydraulic clutch B, and the hydraulic pressure is not supplied to the hydraulic clutch B.

When the engine restarts, the control unit 10 causes the second valve body 8 to move to the valve-opened position, as illustrated in FIG. 2, by energization to the switching valve V1 and the pressure of the oil guided to the second chamber 4b is released.

At this time, the oil flows in the second chamber 4b through the guide path 7 from the first chamber 4a; however, the guide path 7 is configured of the throttle flow path having the sectional area smaller than that of the communication path 13. Therefore, the movement of the first valve body 3 to the valve-opened position is not hindered by the oil flowing in the second chamber 4b through the guide path 7.

In this manner, the pressure of the oil flowing in the first chamber 4a from the receiving port 5 causes the first valve body 3 to move to the valve-opened position against the bias force of the coil spring 9, the oil flowing in the first chamber 4a flows to the oil supply path B2 through the oil inflow path 2, and the hydraulic pressure is supplied to the hydraulic clutch B.

when the oil in the accumulator 1 is supplied to the hydraulic clutch B, and thereby the oil pressure in the accumulator 1 is reduced, the pressure of the oil in the first chamber 4a becomes equal to the pressure of the oil in the second chamber 4b through the guide path 7 and the first valve body 3 moves to the valve-closed position by the bias force of the bias member 9.

When a predetermined time elapses after the start of the engine, the control unit 10 causes the switching valve V1 to be de-energized and causes the second valve body 8 to move to the valve-closed position.

When the oil pump P is driven and oil with a predetermined pressure is discharged to the oil supply path B2, the oil flows back through the oil inflow path 2, causes the first valve body 3 to be opened against the bias force of the bias member 9, and flows in the first chamber 4a. The oil flowing in the first chamber 4a flows to the upstream-side portion 2a through the receiving port 5 and the accumulator 1 is filled with the oil.

When the accumulator 1 is filled with the oil, the oil in the first chamber 4a flows in the second chamber 4b through the guide path 7. When the pressure of the oil in the first chamber 4a becomes equal to the pressure of the oil in the second chamber 4b, the first valve body 3 moves to the valve-closed position by the bias force of the bias member 9.

Second Embodiment

Figure 3:
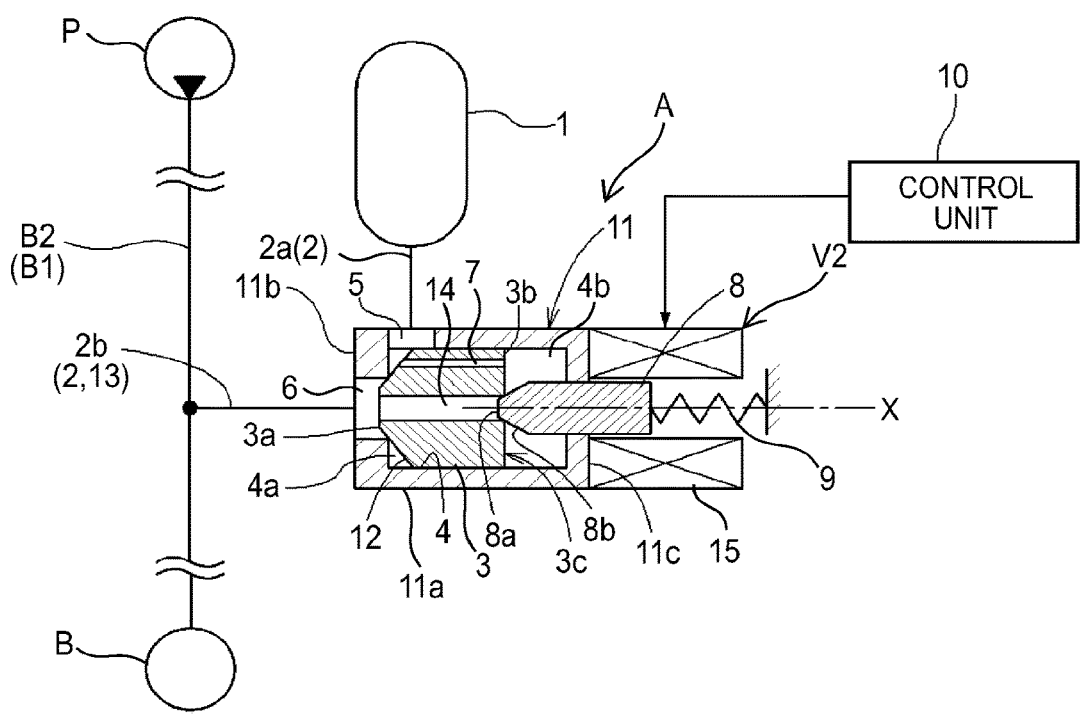
FIG. 3 is a sectional view illustrating a fluid control device of a second embodiment, in which a first valve body is disposed at a valve-closed position.
Figure 4:
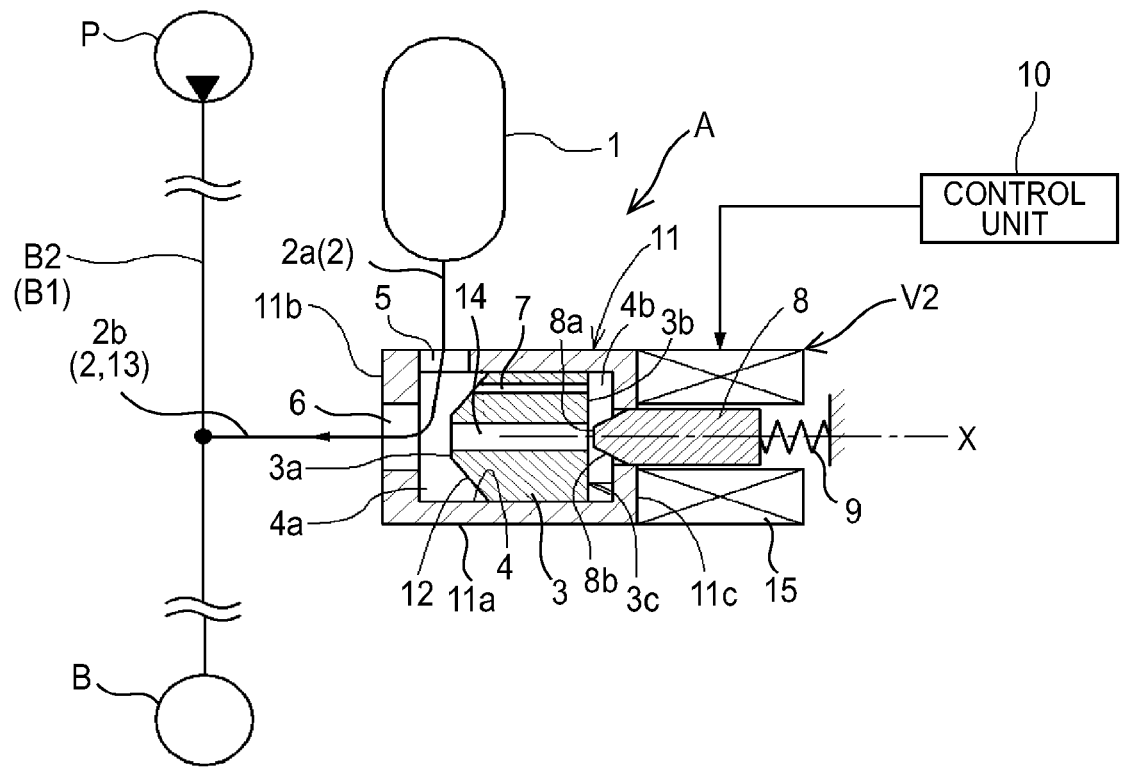
FIG. 4 is a sectional view illustrating the fluid control device of the second embodiment, in which the first valve body is disposed at a valve-opened position.

A fluid control device A of the second embodiment is illustrated in FIG. 3 and FIG. 4.

The fluid control device A of the second embodiment is configured to include a through-path 14, the discharge port 6, and the downstream-side portion 2b of the oil inflow path 2, as the communication path 13 through which the second chamber 4b communicates with the oil supply path B2. The through-path 14, through which the first chamber 4a communicates with the second chamber 4b and which has a circular shape in the sectional view, is provided in the first valve body 3 and is concentric to the valve body axis X.

Also, the second valve body 8 corresponds to a valve body of an electromagnetic switching valve V2 that opens and closes the through-path 14 formed in the first valve body 3 such that the oil in the second chamber 4b is discharged to the oil supply path B2 from the discharge port 6 through the first chamber 4a, and the second valve body is biased to move to the first valve body 3 side by the coil spring 9 that biases the first valve body 3 to the discharge port 6 side.

The second valve body 8 is formed to have a tip section in a circular truncated cone shape, which includes a circular tip surface 8a orthogonal to the valve body axis X and a conic lateral surface 8b. The outer diameter of the tip surface 8a is smaller than the inner diameter of the through-path 14.

The second valve body 8 moves to the valve-closed position (FIG. 3) at which the tip surface 8a is inserted in the through-path 14 by the bias force of the coil spring 9 in a state in which a solenoid 15 is not energized. When the solenoid 15 is energized, the second valve body moves to the valve-opened position (FIG. 4) at which the tip surface 8a slips from the through-path 14.

Accordingly, in the state in which the second valve body 8 moves to the valve-closed position, oil pressure in the accumulator 1 is not applied to the tip surface 8a.

In other words, since a pressure receiving surface of the tip section of the second valve body 8, which is biased in a valve opening direction due to the pressure of the oil in the second chamber 4b, is the conic lateral surface 8b which is a surface except the tip surface 8a, a force to move the second valve body 8 to a side on which the valve is opened, due to the pressure of the oil in the second chamber 4b, is small.

In this manner, it is possible to reduce the bias force of the coil spring 9 that biases and moves the second valve body 8 to the valve-closed position, compared to a case of a structure in which, although not illustrated, a through-hole is provided in a wall which partitions the second chamber 4b of the valve casing 11 and the oil pressure of the second chamber 4b is released by the second valve body that opens and closes the through-hole.

When the bias force of the coil spring 9 is small, a solenoid 15 having a small suction force is provided as the solenoid 15 that causes the second valve body 8 to move to the valve-opened position against the bias force of the coil spring 9. Therefore, it is possible to achieve miniaturization of the device or reduction of manufacturing costs.

The other configurations except those described above are the same as that in the first embodiment.

Third Embodiment

Figure 5:
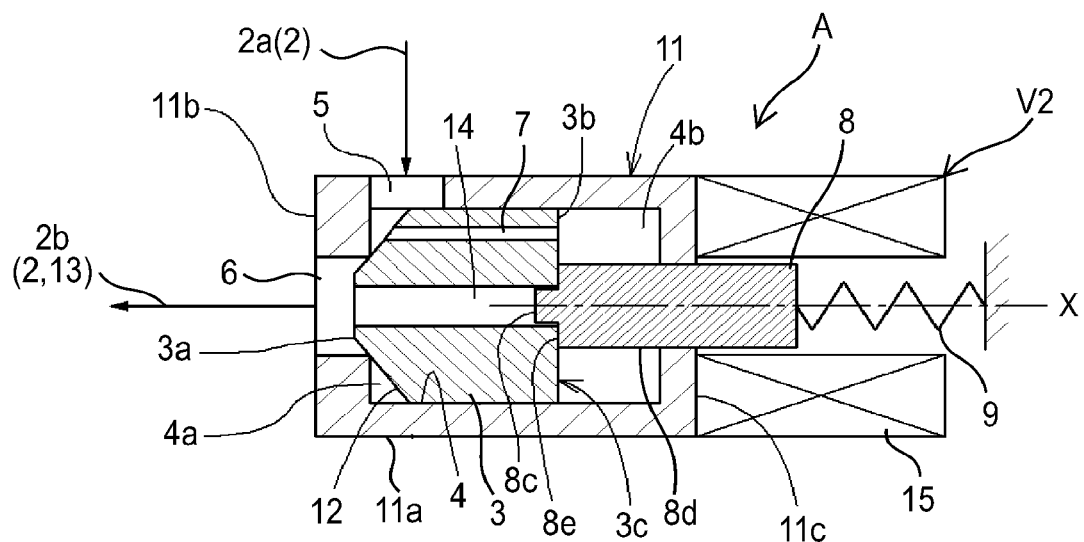
FIG. 5 is a sectional view illustrating main parts of a third embodiment, in which a first valve body is disposed at a valve-closed position.

FIG. 5 illustrates a modification example of the second embodiment.

The second valve body 8 includes a small-diameter shaft section 8c having a diameter smaller than that of the inner diameter of the through-path 14 and a large-diameter shaft section 8d having a diameter larger than that of the inner diameter of the through-path 14 and both shaft sections are concentric. An annular surface 8e parallel to the end surface 3c of the first valve body 3, which faces the second chamber 4b, is formed at a step portion between the small-diameter shaft section 8c and the large-diameter shaft section 8d. The large-diameter shaft section 8d is formed to have the same diameter over the entire length.

Accordingly, as illustrated in FIG. 5, when the second valve body 8 moves to the valve-closed position, the small-diameter shaft section 8c is inserted in the through-path 14 and the annular surface 8e comes into close contact with the end surface 3c of the first valve body 3 over the entire surface.

In this manner, in the state in which the second valve body 8 moves to the valve-closed position, the oil pressure of the accumulator 1 is not applied in the direction in which the second valve body 8 moves to the valve-opened position.

Therefore, it is possible to further reduce the bias force of the coil spring 9 which biases and moves the second valve body 8 to the valve-closed position.

Accordingly, according to the third embodiment, since the solenoid 15 having the suction force still smaller than that in the second embodiment is provided, it is still easier to achieve miniaturization of the device or reduction of manufacturing costs.

The other configurations except those described above are the same as that in the second embodiment.

A feature of a fluid control device according to an aspect of this disclosure resides in a configuration in which the fluid control device includes a valve body accommodating chamber having an inner space that is divided into a first chamber and a second chamber by a first valve body; a receiving port, which opens to the first chamber and through which a fluid from an accumulator is received in the first chamber, and a discharge port, which opens to the first chamber and through which the fluid is discharged from the first chamber; a guide path that guides the fluid from the accumulator to the second chamber such that the first valve body moves to a valve-closed position to close the discharge port; a second valve body which is switchable between two states of maintaining and releasing pressure of the fluid guided to the second chamber; and a bias member that biases the first valve body to the valve-closed position.

In the fluid control device having this configuration, a fluid pressure accumulated in the accumulator is used such that with a small operation force, the first valve body can move to the valve-opened position when the fluid from the accumulator is caused to flow through a fluid supply path, and the first valve body can reliably move to the valve-closed position when the fluid is caused not to flow through the fluid supply path.

In other words, when the first valve body is caused to move to the valve-closed position to close the discharge port, the second valve body is switched to the state of maintaining the pressure of the fluid guided to the second chamber.

With this configuration, the pressure of the fluid guided from the accumulator through the guide path to the second chamber can act to move the first valve body to the valve-closed position, in addition to the bias force which biases the first valve body to the valve-closed position and the fluid pressure accumulated in the accumulator can cause the first valve body to reliably move to the valve-closed position.

When the first valve body is caused to move to the valve-opened position to open the discharge port, the second valve body is switched to the state of releasing the pressure of the fluid guided to the second chamber.

In this manner, a pressing force to press the first valve body to the valve-closed position from the second chamber side is reduced and the first valve body moves to the valve-opened position.

Accordingly, the bias force of the bias member is set to be smaller than a force to cause the first valve body to move to the valve-opened position, which is applied due to the pressure of the fluid received in the first chamber from the receiving port. In this manner, the fluid pressure accumulated in the accumulator is used through an operation of the second valve body such that the first valve body can move to the valve-opened position.

According to the fluid control device having this configuration, even in the case where a high fluid pressure is accumulated in an accumulator, with a small operation force, the valve body can move to the valve-opened position when the fluid in an accumulator is caused to flow through the fluid supply path, and the valve body can reliably move to the valve-closed position when the fluid is caused not to flow through the fluid supply path.

Another feature of the aspect of this disclosure resides in a configuration in which the second valve body is a valve body of a switching valve with which the fluid in the second chamber is releasable to the outside without passing through the valve body accommodating chamber.

According to this configuration, the operation of the second valve body disposed regardless of disposition of the valve body accommodating chamber can cause the first valve body to move to the valve-opened position and the valve-closed position and it is possible to enhance flexibility of the disposition of the second valve body.

Still another feature of the aspect of this disclosure resides in a configuration in which the second valve body is a valve body of a switching valve with which a through-path formed in the first valve body is opened and closed such that the fluid in the second chamber is discharged from the discharge port through the first chamber, and the second valve body may be biased to the first valve body side by the bias member.

When the first valve body is caused to move to the valve-opened position from the valve-closed position, the through-path formed in the first valve body is opened, and the second valve body is switched to a valve-opened state in which the fluid in the second chamber flows to the first chamber through the through-path.

With this configuration, the pressure of the fluid guided to the second chamber through the guide path can be released and the operation of the second valve body by a small force can cause the first valve body to move to the valve-opened position.

When the first valve body is caused to move from the valve-opened position to the valve-closed position, the through-path formed in the first valve body is closed and the second valve body is switched to a state of stopping the fluid from flowing to the first chamber from the second chamber.

In this manner, the pressure of the fluid guided to the second chamber through the guide path can be equal to the pressure of the fluid guided to the first chamber and can be applied to move the first valve body such that the discharge port is closed, in addition to the bias force by the bias member.

Thus, according to this configuration, it is possible to assemble the second valve body in the valve body accommodating chamber in advance and it is possible to achieve a simplified connection structure thereof to the fluid supply path.

In addition, when the first valve body moves to the valve-closed position, the second valve body closes the through-path, and thereby the bias force of the bias member is applied to the first valve body through the second valve body. At this time, since a force applied to the first chamber, from the force applied to the first valve body, balances the force applied from the second chamber, a force from the second valve body is weak. Hence, a simplified biasing structure is configured to bias the first valve body and the second valve body.

Yet another feature of the aspect of this disclosure resides in a configuration in which the second valve body is configured to be separated from the first valve body by a solenoid.

According to this configuration, even when the solenoid having the small operation force (suction force) is used, the second valve body can be caused to move such that the first valve body can be caused to move between the valve-opened position and the valve-closed position.

Still yet another feature of the aspect of this disclosure resides in a configuration in which the guide path is formed to penetrate the first valve body such that the first chamber and the second chamber communicate with each other.

According to this configuration, the guide path is provided in the first valve body in advance such that there is no need to provide a guide path separately in the valve body accommodating chamber and it is possible to achieve a simplified connection structure to the fluid supply path.

The Other Embodiments

1. According to an embodiment disclosed here, a guide path that guides the fluid in the accumulator to the second chamber from the first chamber may be provided between the inner surface of the valve body accommodating chamber and the outer circumferential surface of the first valve body.

2. According to an embodiment disclosed here, a drain path, through which the fluid in the second chamber is discharged to the outside, may be provided and a valve body that opens and closes the drain path may be provided as the second valve body that is switchable between two states of maintaining and releasing the fluid pressure in the second chamber.

An embodiment disclosed here can be applied to fluid control devices having various purposes in addition to a fluid control device in which oil in an accumulator is caused to flow to an oil supply path of a hydraulic clutch.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fluid control device comprising:
a valve body accommodating chamber having an inner space that is divided into a first chamber and a second chamber by a first valve body;
a receiving port, which opens to the first chamber and through which a fluid from an accumulator is received in the first chamber, and a discharge port, which opens to the first chamber and through which the fluid is discharged from the first chamber;
a guide path that guides the fluid from the accumulator to the second chamber such that the first valve body moves to a valve-closed position to close the discharge port;
a second valve body which is switchable between a state of maintaining pressure of the fluid guided to the second chamber and a state of releasing the pressure; and
a bias member that biases the first valve body to the valve-closed position,
wherein the fluid control device branches from a hydraulic circuit including an oil supply path, and the second valve body is located between the oil supply path and the second chamber.

2. The fluid control device according to claim 1,
wherein the second valve body is a valve body of a switching valve with which the fluid in the second chamber is releasable to the outside without passing through the valve body accommodating chamber.

3. The fluid control device according to claim 1,
wherein the second valve body is a valve body of a switching valve with which a through-path formed through the first valve body is opened and closed such that the fluid in the second chamber is discharged from the discharge port through the first chamber, and the second valve body is biased to the first valve body side by the bias member.

4. The fluid control device according to claim 3,
wherein the second valve body is configured to be separated from the first valve body by a solenoid.

5. The fluid control device according to claim 1,
wherein the guide path is formed to penetrate the first valve body such that the first chamber and the second chamber communicate with each other.

\* \* \* \* \*